(12) United States Patent
Liu et al.

(10) Patent No.: US 8,158,546 B2
(45) Date of Patent: Apr. 17, 2012

(54) TRANSPARENT AQUA-BASED NANO SOL-GEL COMPOSITION AND METHOD OF APPLYING THE SAME

(75) Inventors: Wen-Chuan Liu, Hsi-Chih (TW); Chien-Kuo Huang, Hsi-Chih (TW); Shiaw-Tseh Chiang, Hsi-Chih (TW)

(73) Assignee: ONID Technology (Shanghai) Corp., Shanghai (CN)

( * ) Notice: Subject to any disclaimer, the term of this patent is extended or adjusted under 35 U.S.C. 154(b) by 793 days.

(21) Appl. No.: 12/267,025

(22) Filed: Nov. 7, 2008

(65) Prior Publication Data

US 2009/0123647 A1    May 14, 2009

(51) Int. Cl.
*B01J 29/06* (2006.01)
(52) U.S. Cl. .................... 502/62; 428/428; 427/240
(58) Field of Classification Search .................... 502/62
See application file for complete search history.

(56) References Cited

U.S. PATENT DOCUMENTS

| | | | | |
|---|---|---|---|---|
| 5,105,310 | A | 4/1992 | Dickey | 359/586 |
| 5,147,125 | A | 9/1992 | Austin | 359/359 |
| 5,216,542 | A | 6/1993 | Szczyrbowski et al. | 359/588 |
| 6,680,135 | B2 * | 1/2004 | Boire et al. | 428/702 |
| 2008/0014451 | A1 | 1/2008 | Metz et al. | 428/447 |

FOREIGN PATENT DOCUMENTS

| | | |
|---|---|---|
| CN | 1447133 A | 8/2003 |
| CN | 1101353 C | 12/2003 |
| CN | 1579981 A | 2/2005 |
| CN | 1660955 A | 8/2005 |
| JP | 2002-212464 | 7/2002 |
| JP | 2006-335895 | 12/2006 |
| TW | 313630 | 7/1996 |

OTHER PUBLICATIONS

"Test Method for Self-Cleaning Performance of Photocatalytic Building Materials" of the Taiwan Photocatalyst Industry Association Sep. 8, 2007, 4 pgs. (and English translation thereof).

* cited by examiner

*Primary Examiner* — Elizabeth Wood
(74) *Attorney, Agent, or Firm* — Woodard Emhardt Moriarty McNett & Henry

(57) ABSTRACT

The present invention relates to a transparent aqua-based nano sol-gel composition and method of applying the same to transparent substrates without decreasing the visible light and sunlight transmittance thereof. The transparent aqua-based nano sol-gel can be applied to a surface of a transparent substrate to form a porous film which will not reduce the visible light and sunlight transmittance of the transparent substrate and will impart a self-cleaning function to the transparent substrate. The transparent aqua-based nano sol-gel composition contains a transparent aqua-based zeolite sol-gel having a particle size of less than 100 nm, a polysiloxane derivate, a surfactant, a transparent aqua-based photocatalytic sol-gel of titanium dioxide having a particle size of less than 100 nm, and deionized water.

12 Claims, 6 Drawing Sheets

TRANSPARENT AQUA-BASED NANO SOL-GEL COMPOSITION AND METHOD OF APPLYING THE SAME

CROSS REFERENCES TO RELATED APPLICATIONS

This application claims priority to Taiwan Patent Application No. 96142648, filed Nov. 12, 2007, entitled "TRANSPARENT AQUA-BASED NANO SOL-GEL COMPOSITION AND METHOD OF APPLYING THE SAME" which is expressly incorporated by reference herein, in its entirety.

BACKGROUND OF THE INVENTION

1. Field of the Invention

The present invention as disclosed herein and further defined by the claims relates to a transparent aqua-based nano sol-gel composition and a method of applying the same to transparent substrates without decreasing the visible light and sunlight transmittance thereof. The transparent aqua-based nano sol-gel can be applied to a surface of a transparent substrate to form a porous film which will not reduce the visible light and sunlight transmittance of the transparent substrate and will impart a self-cleaning function to the transparent substrate. The transparent aqua-based nano sol-gel composition comprises a transparent aqua-based zeolite sol-gel having a particle size of less than 100 nm, a polysiloxane derivate, a surfactant, a transparent aqua-based photocatalytic sol-gel of titanium dioxide having a particle size of less than 100 nm, and deionized water.

2. Description of the Related Art

Transparent substrates are always used as protection covers of solar energy products and lighting lamps, and the transmittance of the transparent substrates to lights plays an important role to the total efficiency of these products. Generally, glass is used as the transparent substrate, and the reflectivity of glass substrate to light is about 8%. If the reflectivity of glass substrate can be reduced, the transmittance of glass substrate can be increased. In addition, the contaminants or stains on the glass substrates will remarkably reduce the transmittance to light, hence it is desirable to impart the self-cleaning function to the glass substrates and to increase the transmittance of glass substrate to light.

In the market, the anti-reflective glass capable of increasing the transmittance to light and the photocatalyst-coated glass with self-cleaning function have been put into mass production. However, the photocatalyst-coated glass is generally coated with titanium dioxide ($TiO_2$) having high refractive index, and the visible light and sunlight reflectivity thereof is about 12% and hence the transmittance thereof is reduced. Moreover, the application of coating film to the glass is mostly conducted by processes such as vacuum sputtering, physical vapor deposition, chemical vapor deposition, etc. using low pressure vacuum equipment which is very expensive. Despite its innovation and advantage, the functional glass is too expensive to be accepted by the general consuming public. It is therefore important to develop the functional glass with low cost.

U.S. Pat. No. 5,216,542 discloses a multilayer coating structure upon transparent substrate. The top layer of the multilayer structure is silicon dioxide ($SiO_2$) and has a refractive index of 1.46 at a wavelength of 550 nm, which has anti-reflection effect but no self-cleaning property.

U.S. Pat. No. 5,105,310 discloses a multilayer anti-reflection coating upon transparent substrate. The top layer of the multilayer structure is silicon dioxide ($SiO_2$) and has a refractive index of 1.46 at a wavelength of 550 nm, which has anti-reflection effect but no self-cleaning property.

U.S. Pat. No. 5,147,125 discloses a multilayer anti-reflection coating upon transparent substrate. The top layer of the multilayer structure is Magnesium Fluoride ($MgF_2$) and has a refractive index of 1.38 at a wavelength of 550 nm, which has anti-reflection effect but no self-cleaning property.

China Patent No. CN1447133A discloses an anti-reflection layer which is transparent, conductive and can increase the transmittance to light. The top layer of the multilayer is an ITO layer (Indium Tin Oxide), which has anti-reflection effect but no self-cleaning property.

China Patent No. CN1101353C discloses self-cleaning glass and its manufacturing method. The titanium dioxide layer is deposited on the surface of glass by a sputtering process which is expensive. The coated glass has self-cleaning property and its refractive index is about 2.5~2.7. However, the coated glass with high refractive index will remarkably reduce the transmittance to light.

China Patent No. CN1579981A discloses photocatalyst-coated glass and its manufacturing method. The titanium dioxide layer is deposited on the surface of glass by a vacuum sputtering process which is expensive. The coated glass has self-cleaning property and its refractive index is about 2.5~2.7. However, the coated glass with high refractive index will remarkably reduce the transmittance to light.

China Patent No. CN1660955A discloses a spray agent for nano photocatalyst-coated glass and its preparation method. The nano photocatalyst liquid consists of titanium dioxide nanopowder and other nanopowder dispensed in the dispersants. The nano photocatalyst liquid is turbid and will reduce the transmittance to light after coated on the glass.

Taiwan Patent No. 00313630 discloses a method of photocatalytically making the surface of a base material ultrahydrophilic, a base material having ultrahydrophilic and photocatalytic surface, and a process for producing said material. This invention only describes the applications of photocatalyst to different substrates; however, no discussion is made regarding the optical performance for the coated substrates. In addition, parts of the method/process of this invention require the use of 900° C. and such a high temperature is not convenient for all types of substrates.

At present time, there is no commercially available transparent substrate which will not reduce the transmittance to light and possess the self-cleaning property. Therefore, it is the main objective of the present invention to develop a method of manufacturing transparent substrates which will not reduce the visible light and sunlight transmittance and possess the self-cleaning property at low production cost.

BRIEF SUMMARY

The main objective of the present invention is to provide a transparent aqua-based nano sol-gel composition applying to transparent substrates without decreasing the visible light and sunlight transmittance thereof. The transparent aqua-based nano sol-gel can be applied to a surface of a transparent substrate to form a porous film which will not reduce the visible light and sunlight transmittance of the transparent substrate and will impart a self-cleaning function to the transparent substrate. The transparent aqua-based nano sol-gel composition comprises a transparent aqua-based zeolite sol-gel having a particle size of less than 100 nm, a polysiloxane derivate, a surfactant, a transparent aqua-based photocatalytic sol-gel of titanium dioxide having a particle size of less than 100 nm, and deionized water. The test method for the self-cleaning property refers to "Test Method for Self-Cleaning Performance of Photocatalytic Building Materials" published by the Taiwan Photocatalyst Industry Association. The process of the test method comprises the steps of applying the oleic acid to the photocatalytic substrate and making the contact angle of droplet on the substrate higher than 30°. After exposing the substrate under the UVA light with intensity of 1 mW/cm$^2$ or above for 24 hours, the oleic acid applied to the photocatalytic surface can be decomposed and the contact angle of droplet on the substrate is less than 15°.

The present invention can reduce the high production costs of the conventional art, simplify the production process, lower the production temperature, save energy, lower the production cost, and is environmental friendly.

The present invention relates to a transparent aqua-based nano sol-gel composition and a method of applying the same to transparent substrates without decreasing the visible light and sunlight transmittance thereof. The method of applying the transparent aqua-based nano sol-gel composition to transparent substrates comprises the steps of:

1. preparing the transparent aqua-based sol-gel: a transparent aqua-based zeolite sol-gel having a particle size of less than 100 nm, a polysiloxane derivate, a surfactant, a transparent aqua-based photocatalytic sol-gel of titanium dioxide having a particle size of less than 100 nm, and deionized water are well mixed and filtered to obtain the transparent aqua-based sol-gel.

2. preparing the coating film upon transparent substrates: the transparent aqua-based nano sol-gel is applied to a surface of a transparent substrate evenly to form a transparent coating film and then the coating film is cured by a predetermined curing process so that the transparent coating film can adhere to the surface of the substrate more rigidly and reliably. The dry film thickness of the finished transparent aqua-based coating film is between 40~350 nm.

The transparent aqua-based nano sol-gel composition according to the present invention is characterized by comprising: a transparent aqua-based zeolite sol-gel in a solid content of 0.1~15.0 wt %, preferably 0.1~10 wt %, and more preferably 0.1~5 wt %; a polysiloxane derivate in a solid content of 0.0001~10.0 wt %, preferably 0.001~7 wt %, and more preferably 0.01~3 wt %, wherein the polysiloxane derivate is selected from the group consisting of methyltrimethoxysilane, methyltriethoxysilane, ethyltributoxysilane, trimethyldiethyoxysilane, dimethoxymethylphenylsilane, triethoxypropylsilane, tripropoxypropylsilane and tributoxymethylsilane; a non-ionic surfactant in a solid content of 0.0001~10.0 wt %, preferably 0.001~5 wt %, and more preferably 0.01~3 wt %, wherein the surfactant is selected from the group consisting of polyoxyethylene p-octylphenol ether, polyoxyethylene p-octyl laurate, polyoxyethylene sorbitol laurate, polyoxyethylene oleoyl ether, polyoxyethylene stearyl ether, polyoxyethylene sorbitan laurate and oleic diethanol amide; a transparent aqua-based photocatalytic sol-gel of titanium dioxide in a solid content of 0.1~2.0 wt %, preferably 0.1~1.5 wt %, and more preferably 0.1~1 wt %.

The transparent aqua-based nano sol-gel composition is evenly applied to the surface of the transparent substrate with any wet coating method selected from a roll coating method, a wipe coating method, a brush coating method, a dip coating method, a spray coating method, a spin coating method or a sprinkle coating method, which can be carried out to coat one side or both sides of the transparent substrate. The "coating film is cured by a predetermined curing process" mentioned above refers to curing the coating film with natural air drying for 24 hours or above, or heating at a temperature of 450° C. or below for 5 minutes or above.

The transparent substrate referred to in the present invention can be selected from the group consisting of glass and plastic substrates, including transparent glass, transparent polycarbonate resins, transparent polymethacrylate resins, transparent polystyrene resins and transparent epoxy resins.

The transparent coating film formed upon transparent substrates according to the present invention possesses self-cleaning property under light irradiation, and the light can be either sun light or artificial light.

DETAILED DESCRIPTION

Figure 1:
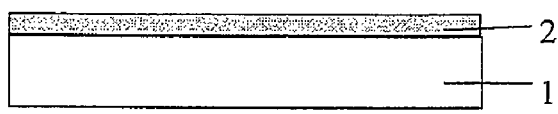
FIG. 1 shows the transparent substrate and the coating film according to the present invention.

For the purposes of promoting an understanding of the disclosure, reference will now be made to the embodiments illustrated in the drawings and specific language will be used to describe the same. It will nevertheless be understood that no limitation of the scope of the disclosure is thereby intended, such alterations and further modifications in the illustrated device and its use, and such further applications of the principles of the disclosure as illustrated therein being contemplated as would normally occur to one skilled in the art to which the disclosure relates.

To operationally verify the preparation of the transparent aqua-based nano sol-gel composition and method of applying the same in accordance with the present invention, eleven examples are illustrated as follows.

Further benefits and advantages of the present invention will become apparent after a careful reading of the detailed description.

EXAMPLE 1

Step 1: A transparent aqua-based nano sol-gel was prepared and obtained by well mixing and then filtering the materials comprising 0.1 wt % solid content of a transparent aqua-based zeolite sol-gel, 0.0001 wt % solid content of methyltrimethoxysilane as the polysiloxane derivate, 0.0001 wt % solid content of polyoxyethylene p-octylphenol ether as the non-ionic surfactant, 0.1 wt % solid content of the transparent aqua-based photocatalytic sol-gel of titanium dioxide, and the rest of de-ionized water.

Figure 2:
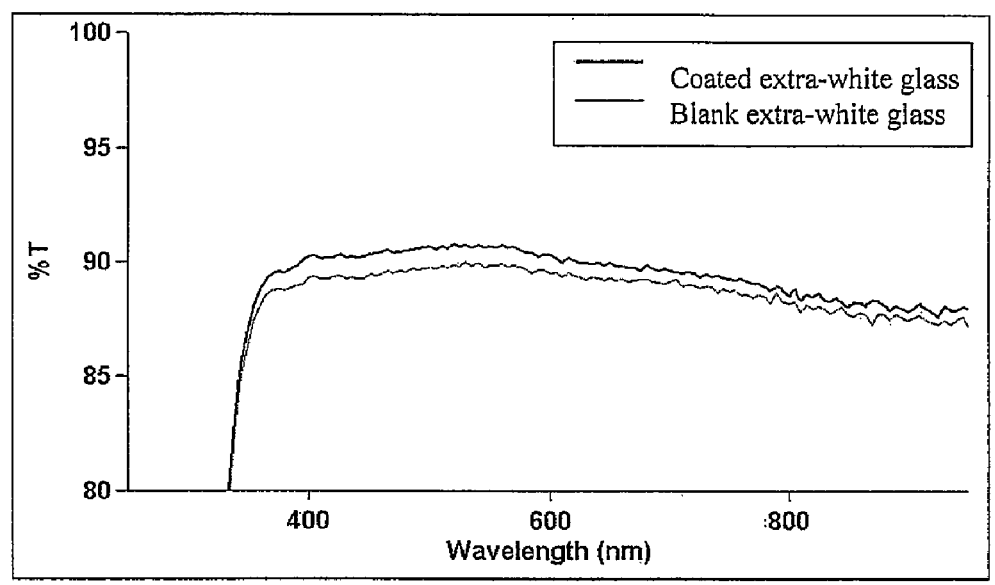
FIG. 2 shows the light transmittance comparison for extra-white glass before coating and after coating according to Example 1.

Step 2: The transparent aqua-based nano sol-gel was evenly applied to the surface of the extra-white glass having the thickness of 5 mm by a dip coating method. As shown in FIG. 1, the surface of glass (1) was firstly cleaned, then the transparent aqua-based nano sol-gel was evenly applied to the surface of the glass (1) by a dip coating method, and a transparent coating film (2) was formed in a thickness of about 40-50 nm on the surface of the glass after cured with nature air drying for 24 hours. A comparison of the transmittance (T %) at different wavelengths between the coated extra-white glass and uncoated extra-white glass is shown in FIG. 2. It is obvious that the transmittance of the coated glass is higher than that of the uncoated glass.

Step 3: A comparison of the self-clean property between the coated glass and the uncoated glass was carried out by using the method of "Test Method for Self-Cleaning performance of Photocatalytic Building Materials" published by Taiwan Photocatalyst Industry Association. The surfaces of both the coated glass and uncoated glass were firstly cleaned, and then the contact angle of a droplet on the two pieces of glass was measured, which was about 35°. Oleic acid was evenly spread upon the surfaces of the coated glass and the uncoated glass to simulate the contamination on the glass, and then the contact angle of a droplet was again measured, which was now about 67° indicating that the surfaces of the pieces of glass were contaminated by oleic acid. The two pieces of contaminated glass were exposed to the irradiation of 1 mW/cm$^2$ of UVA light for 24 hours, 48 hours and 72 hours, and the transmittance and contact angle of the two pieces of contaminated glass were measured at each period. The results are shown in Table 1. The lower contact angle indicates a better self-cleaning property. Also, the uncoated glass possesses no self-cleaning property at all.

As a conclusion from the above Step 2 and Step 3, the film formed by applying the transparent aqua-based nano sol-gel of the present invention to the transparent substrates will not decrease the visible light and sunlight transmittance of the transparent substrates, and can perform the self-cleaning property.

TABLE 1

Variation in contact angle of oleic acid contaminated surface under different UVA exposure periods

| | Uncoated glass | Coated glass |
|---|---|---|
| 0 hours | 67° | 67° |
| 24 hours | 67° | 8° |
| 48 hours | 67° | 8° |
| 72 hours | 67° | 7° |

Step 4: The coating films having different thicknesses were formed on the surfaces of glass substrates having the thickness of 5 mm with the same formulation of transparent aqua-based nano sol-gel and coating method as this example. The pieces of coated glass were then cured under different conditions, and the self-cleaning property and transmittance thereof were measured by following the above Step 2 and Step 3. The results are shown in Table 2. It is clear that the film formed by applying the transparent aqua-based nano sol-gel of the present invention to the glass will not decrease the visible light and sunlight transmittance of the glass, and can perform the self-cleaning property.

TABLE 2

Variations in light transmittance and contact angle under different process conditions

| Item | Thickness of coating film | Curing condition | Comparison of light transmittance | Contact angle on coated glass with oleic acid contamination | |
|---|---|---|---|---|---|
| 1 | 100-120 nm | 90° C. 360 min. | The light transmittance of the coated glass is higher than that of uncoated glass. | 0 hours<br>24 hours<br>48 hours<br>72 hours | 66°<br>8°<br>8°<br>7° |
| 2 | 250-272 nm | 200° C. 60 min. | The light transmittance of the coated glass is higher than that of uncoated glass. | 0 hours<br>24 hours<br>48 hours<br>72 hours | 66°<br>8°<br>7°<br>7° |
| 3 | 330-344 nm | 450° C. 5 min. | The light transmittance of the coated glass is higher than that of uncoated glass. | 0 hours<br>24 hours<br>48 hours<br>72 hours | 66°<br>8°<br>8°<br>6° |

EXAMPLE 2

Step 1: A transparent aqua-based nano sol-gel was prepared and obtained by well mixing and then filtering the materials comprising 15.0 wt % solid content of a transparent aqua-based zeolite sol-gel, 10 wt % solid content of methyltriethoxysilane as the polysiloxane derivate, 10 wt % solid content of polyoxyethylene p-octyl laurate as the non-ionic surfactant, 2 wt % solid content of a transparent aqua-based photocatalytic sol-gel of titanium dioxide, and the rest of de-ionized water.

Figure 3:
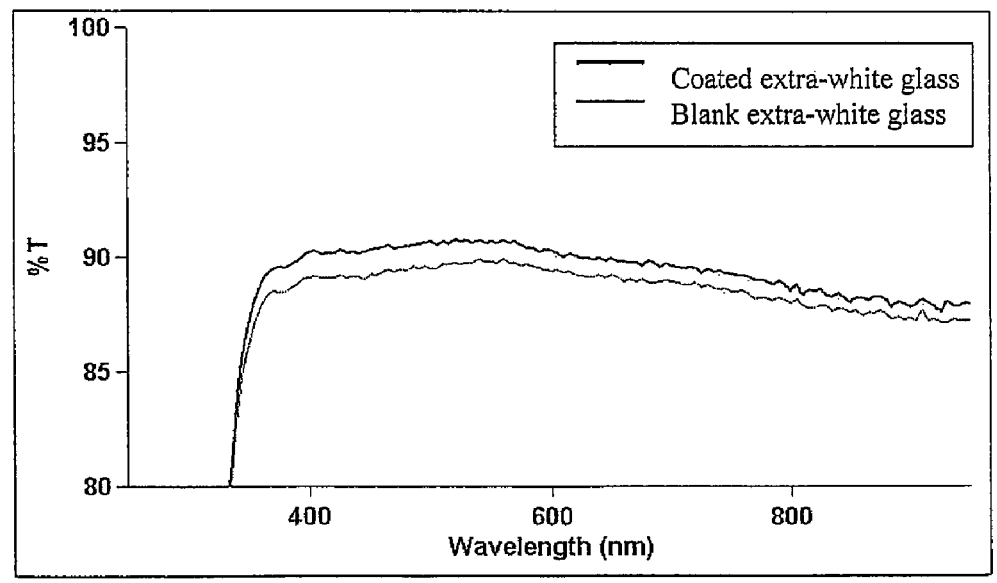
FIG. 3 shows the light transmittance comparison for extra-white glass before coating and after coating according to Example 2.

Step 2: The transparent aqua-based nano sol-gel was evenly applied to the surface of the extra-white glass having the thickness of 5 mm by a spin coating method. As shown in FIG. 1, the surface of glass (1) was firstly cleaned, then the transparent aqua-based nano sol-gel was evenly applied to the surface of the glass (1) by a spin coating method, and a transparent coating film (2) was formed in a thickness of about 12-132 nm on the surface of the glass after cured with nature air drying for 24 hours. A comparison of the transmittance at different wavelengths between the coated extra-white glass and uncoated extra-white glass is shown in FIG. 3. It is obvious that the transmittance of the coated glass is higher than that of the uncoated glass.

Step 3: A comparison of the self-clean property between the coated glass and the uncoated glass was carried out by using the method of "Test Method for Self-Cleaning performance of Photocatalytic Building Materials" published by Taiwan Photocatalyst Industry Association. The surfaces of both the coated glass and uncoated glass were firstly cleaned, and then the contact angle of a droplet on the two pieces of glass was measured, which was about 35°. Oleic acid was evenly spread upon the surfaces of the coated glass and the uncoated glass to simulate the contamination on the glass, and then the contact angle of a droplet was again measured, which was now about 65° indicating that the surfaces of the pieces of glass were contaminated by oleic acid. The two pieces of contaminated glass were exposed to the irradiation of 1 mW/cm$^2$ of UVA light for 24 hours, 48 hours and 72 hours, and the transmittance and contact angle of the two pieces of contaminated glass were measured at each period. The results are shown in Table 3. The lower contact angle indicates a better self-cleaning property. Also, the uncoated glass possesses no self-cleaning property at all.

As a conclusion from the above Step 2 and Step 3, the film formed by applying the transparent aqua-based nano sol-gel of the present invention to the transparent substrates will not decrease the visible light and sunlight transmittance of the transparent substrates, and can perform the self-cleaning property.

TABLE 3

Variation in contact angle of oleic acid contaminated surface under different UVA exposure periods

|  | Uncoated glass | Coated glass |
|---|---|---|
| 0 hours | 65° | 65° |
| 24 hours | 65° | 9° |
| 48 hours | 65° | 9° |
| 72 hours | 65° | 8° |

Step 4: The coating films having different thicknesses were formed on the surfaces of glass substrates having the thickness of 5 mm with the same formulation of transparent aqua-based nano sol-gel and coating method as this example. The pieces of coated glass were then cured under different conditions, and the self-cleaning property and transmittance thereof were measured by following the above Step 2 and Step 3. The results are shown in Table 4. It is clear that the film formed by applying the transparent aqua-based nano sol-gel of the present invention to the glass will not decrease the visible light and sunlight transmittance of the glass, and can perform the self-cleaning property.

TABLE 4

Variations in light transmittance and contact angle under different process conditions

| Item | Thickness of coating film | Curing condition | Comparison of light transmittance | Contact angle on coated glass with oleic acid contamination | |
|---|---|---|---|---|---|
| 1 | 325-335 nm | 150° C. 240 min. | The light transmittance of the coated glass is higher than that of uncoated glass. | 0 hours<br>24 hours<br>48 hours<br>72 hours | 65°<br>9°<br>9°<br>8° |
| 2 | 160-180 nm | 350° C. 40 min. | The light transmittance of the coated glass is higher than that of uncoated glass. | 0 hours<br>24 hours<br>48 hours<br>72 hours | 65°<br>9°<br>9°<br>8° |
| 3 | 260-278 nm | 450° C. 10 min. | The light transmittance of the coated glass is higher than that of uncoated glass. | 0 hours<br>24 hours<br>48 hours<br>72 hours | 65°<br>9°<br>8°<br>8° |

EXAMPLE 3

Step 1: A transparent aqua-based nano sol-gel was prepared and obtained by well mixing and then filtering the materials comprising 2.0 wt % solid content of transparent aqua-based zeolite sol-gel, 3.0 wt % solid content of ethyl-tributoxysilane as the polysiloxane derivate, 2.0 wt % solid content of polyoxyethylene sorbitol laurate as the non-ionic surfactant, 0.7 wt % solid content of transparent aqua-based photocatalytic sol-gel of titanium dioxide, and the rest of de-ionized water.

Figure 4:
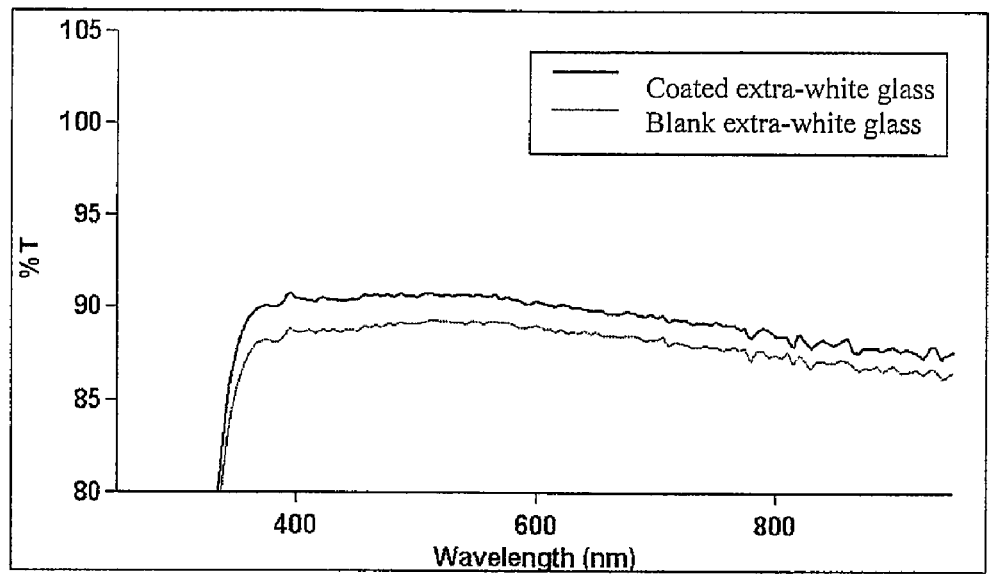
FIG. 4 shows the light transmittance comparison for extra-white glass before coating and after coating according to Example 3.

Step 2: The transparent aqua-based nano sol-gel was evenly applied to the surface of the extra-white glass having the thickness of 5 mm by a wipe coating method. As shown in FIG. 1, the surface of glass (1) was firstly cleaned, then the transparent aqua-based nano sol-gel was evenly applied to the surface of the glass (1) by a wipe coating method, and a transparent coating film (2) was formed in a thickness of about 95-105 nm on the surface of the glass after cured with nature air drying for 24 hours. A comparison of the transmittance at different wavelengths between the coated extra-white glass and uncoated extra-white glass is shown in FIG. 4. It is obvious that the transmittance of the coated glass is higher than that of the uncoated glass.

Step 3: A comparison of the self-clean property between the coated glass and the uncoated glass was carried out by using the method of "Test Method for Self-Cleaning performance of Photocatalytic Building Materials" published by Taiwan Photocatalyst Industry Association. The surfaces of both the coated glass and uncoated glass were firstly cleaned, and then the contact angle of a droplet on the two pieces of glass was measured, which was about 35°. Oleic acid was evenly spread upon the surfaces of the coated glass and the uncoated glass to simulate the contamination on the glass, and then the contact angle of a droplet was again measured, which was now about 68° indicating that the surfaces of the pieces of glass were contaminated by oleic acid. The two pieces of contaminated glass were exposed to the irradiation of 1 mW/cm$^2$ of UVA light for 24 hours, 48 hours and 72 hours, and the transmittance and contact angle of the two pieces of contaminated glass were measured at each period. The results are shown in Table 5. The lower contact angle indicates a better self-cleaning property. Also, the uncoated glass possesses no self-cleaning property at all.

As a conclusion from the above Step 2 and Step 3, the film formed by applying the transparent aqua-based nano sol-gel of the present invention to the transparent substrates will not decrease the visible light and sunlight transmittance of the transparent substrates, and can perform the self-cleaning property.

TABLE 5

Variation in contact angle of oleic acid contaminated surface under different UVA exposure periods

|  | Uncoated glass | Coated glass |
|---|---|---|
| 0 hours | 68° | 68° |
| 24 hours | 68° | 7° |
| 48 hours | 68° | 7° |
| 72 hours | 68° | 6° |

Step 4: The coating films having different thicknesses were formed on the surfaces of glass substrates having the thickness of 5 mm with the same formulation of transparent aqua-based nano sol-gel and coating method as this example. The pieces of coated glass were then cured under different conditions, and the self-cleaning property and transmittance thereof were measured by following the above Step 2 and Step 3. The results are shown in Table 6. It is clear that the film formed by applying the transparent aqua-based nano sol-gel of the present invention to the glass will not decrease the visible light and sunlight transmittance of the glass, and can perform the self-cleaning property.

TABLE 6

Variations in light transmittance and contact angle under different process conditions

| Item | Thickness of coating film | Curing condition | Comparison of light transmittance | Contact angle on coated glass with oleic acid contamination | |
|---|---|---|---|---|---|
| 1 | 58-70 nm | 120° C. 300 min. | The light transmittance of the coated glass is higher than that of uncoated glass. | 0 hours<br>24 hours<br>48 hours<br>72 hours | 68°<br>7°<br>7°<br>6° |
| 2 | 335-350 nm | 320° C. 60 min. | The light transmittance of the coated glass is higher than that of uncoated glass. | 0 hours<br>24 hours<br>48 hours<br>72 hours | 68°<br>7°<br>6°<br>6° |
| 3 | 202-215 nm | 450° C. 5 min. | The light transmittance of the coated glass is higher than that of uncoated glass. | 0 hours<br>24 hours<br>48 hours<br>72 hours | 68°<br>7°<br>6°<br>6° |

EXAMPLE 4

Step 1: A transparent aqua-based nano sol-gel was prepared and obtained by well mixing and then filtering the materials comprising 5.0 wt % solid content of a transparent aqua-based zeolite sol-gel, 6.0 wt % solid content of trimethyldiethyoxysilane as the polysiloxane derivate, 8.0 wt % solid content of polyoxyethylene oleoyl ether as the non-ionic surfactant, 1.0 wt % solid content of a transparent aqua-based photocatalytic sol-gel of titanium dioxide, and the rest of de-ionized water.

Figure 5:
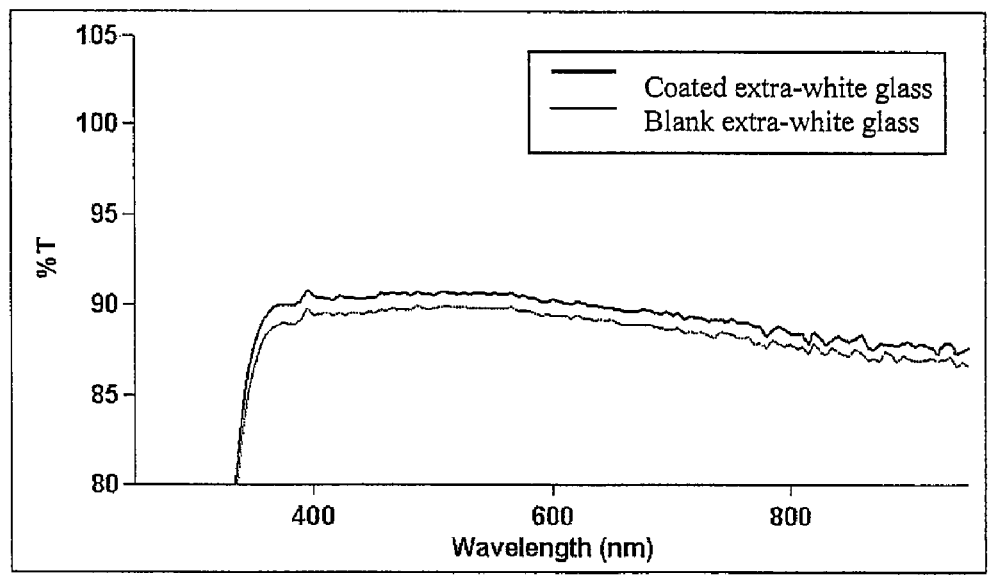
FIG. 5 shows the light transmittance comparison for extra-white glass before coating and after coating according to Example 4.

Step 2: The transparent aqua-based nano sol-gel was evenly applied to the surface of the extra-white glass having the thickness of 5 mm by a roll coating method. As shown in FIG. 1, the surface of glass (1) was firstly cleaned, then the transparent aqua-based nano sol-gel was evenly applied to the surface of the glass (1) by a roll coating method, and a transparent coating film (2) was formed in a thickness of about 125-146 nm on the surface of the glass after cured with nature air drying for 24 hours. A comparison of the transmittance at different wavelengths between the coated extra-white glass and uncoated extra-white glass is shown in FIG. 5. It is obvious that the transmittance of the coated glass is higher than that of the uncoated glass.

Step 3: A comparison of the self-clean property between the coated glass and the uncoated glass was carried out by using the method of "Test Method for Self-Cleaning performance of Photocatalytic Building Materials" published by Taiwan Photocatalyst Industry Association. The surfaces of both the coated glass and uncoated glass were firstly cleaned, and then the contact angle of a droplet on the two pieces of glass was measured, which was about 35°. Oleic acid was evenly spread upon the surfaces of the coated glass and the uncoated glass to simulate the contamination on the glass, and then the contact angle of a droplet was again measured, which was now about 64° indicating that the surfaces of the pieces of glass were contaminated by oleic acid. The two pieces of contaminated glass were exposed to the irradiation of 1 mW/cm² of UVA light for 24 hours, 48 hours and 72 hours, and the transmittance and contact angle of the two pieces of contaminated glass were measured at each period. The results are shown in Table 7. The lower contact angle indicates a better self-cleaning property. Also, the uncoated glass possesses no self-cleaning property at all.

As a conclusion from the above Step 2 and Step 3, the film formed by applying the transparent aqua-based nano sol-gel of the present invention to the transparent substrates will not decrease the visible light and sunlight transmittance of the transparent substrates, and can perform the self-cleaning property.

TABLE 7

Variation in contact angle of oleic acid contaminated surface under different UVA exposure periods

| | Uncoated glass | Coated glass |
|---|---|---|
| 0 hours | 64° | 64° |
| 24 hours | 64° | 8° |
| 48 hours | 64° | 8° |
| 72 hours | 64° | 6° |

Step 4: The coating films having different thicknesses were formed on the surfaces of glass substrates having the thickness of 5 mm with the same formulation of transparent aqua-based nano sol-gel and coating method as this example. The pieces of coated glass were then cured under different conditions, and the self-cleaning property and transmittance thereof were measured by following the above Step 2 and Step 3. The results are shown in Table 8. It is clear that the film formed by applying the transparent aqua-based nano sol-gel of the present invention to the glass will not decrease the visible light and sunlight transmittance of the glass, and can perform the self-cleaning property.

TABLE 8

Variations in light transmittance and contact angle under different process conditions

| Item | Thickness of coating film | Curing condition | Comparison of light transmittance | Contact angle on coated glass with oleic acid contamination | |
|---|---|---|---|---|---|
| 1 | 82-95 nm | 80° C. 480 min. | The light transmittance of the coated glass is higher than that of uncoated glass. | 0 hours<br>24 hours<br>48 hours<br>72 hours | 64°<br>8°<br>7°<br>6° |
| 2 | 295-320 nm | 280° C. 70 min. | The light transmittance of the coated glass is higher than that of uncoated glass. | 0 hours<br>24 hours<br>48 hours<br>72 hours | 64°<br>8°<br>7°<br>6° |
| 3 | 222-246 nm | 420° C. 10 min. | The light transmittance of the coated glass is higher than that of uncoated glass. | 0 hours<br>24 hours<br>48 hours<br>72 hours | 64°<br>8°<br>6°<br>6° |

EXAMPLE 5

Step 1: A transparent aqua-based nano sol-gel was prepared and obtained by well mixing and then filtering the materials comprising 10.0 wt % solid content of a transparent aqua-based zeolite sol-gel, 10.0 wt % solid content of dimethoxymethylphenylsilane as the polysiloxane derivate, 2.0 wt % solid content of polyoxyethylene stearyl ether as the non-ionic surfactant, 1.5 wt % solid content of transparent aqua-based photocatalytic sol-gel of titanium dioxide, and the rest of de-ionized water.

Figure 6:
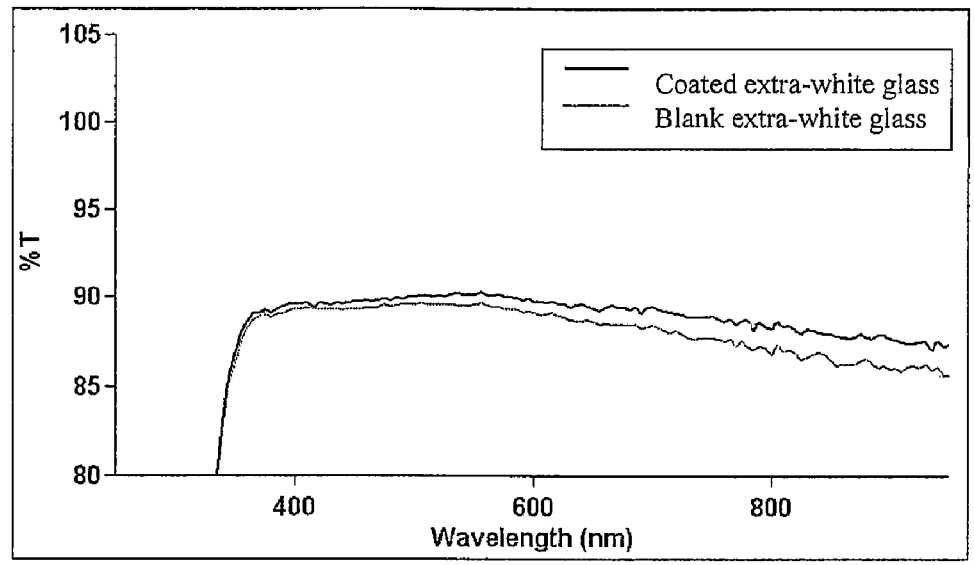
FIG. 6 shows the light transmittance comparison for extra-white glass before coating and after coating according to Example 5.

Step 2: The transparent aqua-based nano sol-gel was evenly applied to the surface of the extra-white glass having the thickness of 5 mm by a spray coating method. As shown in FIG. 1, the surface of glass (1) was firstly cleaned, then the transparent aqua-based nano sol-gel was evenly applied to the surface of the glass (1) by a spray coating method, and a transparent coating film (2) was formed in a thickness of about 140-170 nm on the surface of the glass after cured with nature air drying for 24 hours. A comparison of the transmittance at different wavelengths between the coated extra-white glass and uncoated extra-white glass is shown in FIG. 6. It is obvious that the transmittance of the coated glass is higher than that of the uncoated glass.

Step 3: A comparison of the self-clean property between the coated glass and the uncoated glass was carried out by using the method of "Test Method for Self-Cleaning performance of Photocatalytic Building Materials" published by Taiwan Photocatalyst Industry Association. The surfaces of both the coated glass and uncoated glass were firstly cleaned, and then the contact angle of a droplet on the two pieces of glass was measured, which was about 35°. Oleic acid was evenly spread upon the surfaces of the coated glass and the uncoated glass to simulate the contamination on the glass, and then the contact angle of a droplet was again measured, which was now about 69° indicating that the surfaces of the pieces of glass were contaminated by oleic acid. The two pieces of contaminated glass were exposed to the irradiation of 1 mW/cm$^2$ of UVA light for 24 hours, 48 hours and 72 hours, and the transmittance and contact angle of the two pieces of contaminated glass were measured at each period. The results are shown in Table 9. The lower contact angle indicates a better self-cleaning property. Also, the uncoated glass possesses no self-cleaning property at all.

As a conclusion from the above Step 2 and Step 3, the film formed by applying the transparent aqua-based nano sol-gel of the present invention to the transparent substrates will not decrease the visible light and sunlight transmittance of the transparent substrates, and can perform the self-cleaning property.

TABLE 9

Variation in contact angle of oleic acid contaminated surface under different UVA exposure periods

|          | Uncoated glass | Coated glass |
|----------|----------------|--------------|
| 0 hours  | 69°            | 69°          |
| 24 hours | 69°            | 9°           |
| 48 hours | 69°            | 8°           |
| 72 hours | 69°            | 6°           |

Step 4: The coating films having different thicknesses were formed on the surfaces of glass substrates having the thickness of 5 mm with the same formulation of transparent aqua-based nano sol-gel and coating method as this example. The pieces of coated glass were then cured under different conditions, and the self-cleaning property and transmittance thereof were measured by following the above Step 2 and Step 3. The results are shown in Table 10. It is clear that the film formed by applying the transparent aqua-based nano sol-gel of the present invention to the glass will not decrease the visible light and sunlight transmittance of the glass, and can perform the self-cleaning property.

TABLE 10

Variations in light transmittance and contact angle under different process conditions

| Item | Thickness of coating film | Curing condition | Comparison of light transmittance | Contact angle on coated glass with oleic acid contamination | |
|------|---------------------------|------------------|-----------------------------------|----------|------|
| 1 | 95-120 nm | 150° C. 180 min. | The light transmittance of the coated glass is higher than that of uncoated glass. | 0 hours | 69° |
| | | | | 24 hours | 9° |
| | | | | 48 hours | 8° |
| | | | | 72 hours | 7° |
| 2 | 198-220 nm | 300° C. 60 min. | The light transmittance of the coated glass is higher than that of uncoated glass. | 0 hours | 69° |
| | | | | 24 hours | 9° |
| | | | | 48 hours | 8° |
| | | | | 72 hours | 6° |
| 3 | 328-350 nm | 400° C. 10 min. | The light transmittance of the coated glass is higher than that of uncoated glass. | 0 hours | 69° |
| | | | | 24 hours | 9° |
| | | | | 48 hours | 7° |
| | | | | 72 hours | 6° |

EXAMPLE 6

Step 1: A transparent aqua-based nano sol-gel was prepared and obtained by well mixing and then filtering the materials comprising 7.0 wt % solid content of a transparent aqua-based zeolite sol-gel, 1.0 wt % solid content of methyltributoxysilane as the polysiloxane derivate, 5.0 wt % solid content of oleic diethanol amide as the non-ionic surfactant, 0.8 wt % solid content of a transparent aqua-based photocatalytic sol-gel of titanium dioxide, and the rest of de-ionized water.

Figure 7:
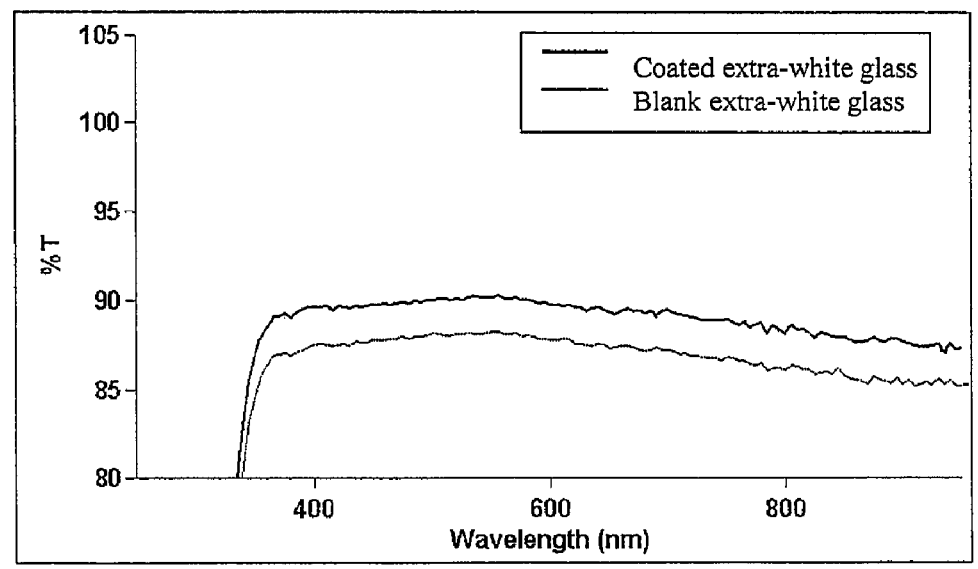
FIG. 7 shows the light transmittance comparison for extra-white glass before coating and after coating according to Example 6.

Step 2: The transparent aqua-based nano sol-gel was evenly applied to the surface of the extra-white glass having the thickness of 5 mm by a brush coating method. As shown in FIG. 1, the surface of glass (1) was firstly cleaned, then the transparent aqua-based nano sol-gel was evenly applied to the surface of the glass (1) by a brush coating method, and a transparent coating film (2) was formed in a thickness of about 136-164 nm on the surface of the glass after cured with nature air drying for 24 hours. A comparison of the transmittance at different wavelengths between the coated extra-white glass and uncoated extra-white glass is shown in FIG. 7. It is obvious that the transmittance of the coated glass is higher than that of the uncoated glass.

Step 3: A comparison of the self-clean property between the coated glass and the uncoated glass was carried out by using the method of "Test Method for Self-Cleaning performance of Photocatalytic Building Materials" published by Taiwan Photocatalyst Industry Association. The surfaces of both the coated glass and uncoated glass were firstly cleaned, and then the contact angle of a droplet on the two pieces of glass was measured, which was about 35°. Oleic acid was evenly spread upon the surfaces of the coated glass and the uncoated glass to simulate the contamination on the glass, and then the contact angle of a droplet was again measured, which was now about 66° indicating that the surfaces of the pieces of glass were contaminated by oleic acid. The two pieces of contaminated glass were exposed to the irradiation of 1 mW/cm$^2$ of UVA light for 24 hours, 48 hours and 72 hours, and the transmittance and contact angle of the two pieces of contaminated glass were measured at each period. The results are shown in Table 11. The lower contact angle indicates a better self-cleaning property. Also, the uncoated glass possesses no self-cleaning property at all.

As a conclusion from the above Step 2 and Step 3, the film formed by applying the transparent aqua-based nano sol-gel of the present invention to the transparent substrates will not decrease the visible light and sunlight transmittance of the transparent substrates, and can perform the self-cleaning property.

TABLE 11

Variation in contact angle of oleic acid contaminated surface under different UVA exposure periods

| | Uncoated glass | Coated glass |
|---|---|---|
| 0 hours | 66° | 66° |
| 24 hours | 66° | 9° |
| 48 hours | 66° | 8° |
| 72 hours | 66° | 6° |

Step 4: The coating films having different thicknesses were formed on the surfaces of glass substrates having the thickness of 5 mm with the same formulation of transparent aqua-based nano sol-gel and coating method as this example. The pieces of coated glass were then cured under different conditions, and the self-cleaning property and transmittance thereof were measured by following the above Step 2 and Step 3. The results are shown in Table 12. It is clear that the film formed by applying the transparent aqua-based nano sol-gel of the present invention to the glass will not decrease the visible light and sunlight transmittance of the glass, and can perform the self-cleaning property.

TABLE 12

Variations in light transmittance and contact angle under different process conditions

| Item | Thickness of coating film | Curing condition | Comparison of light transmittance | Contact angle on coated glass with oleic acid contamination | |
|---|---|---|---|---|---|
| 1 | 43-58 nm | 200° C. 120 min. | The light transmittance of the coated glass is higher than that of uncoated glass. | 0 hours 24 hours 48 hours 72 hours | 66° 8° 8° 6° |
| 2 | 256-283 nm | 300° C. 60 min. | The light transmittance of the coated glass is higher than that of uncoated glass. | 0 hours 24 hours 48 hours 72 hours | 66° 8° 7° 6° |
| 3 | 312-350 nm | 450° C. 10 min. | The light transmittance of the coated glass is higher than that of uncoated glass. | 0 hours 24 hours 48 hours 72 hours | 66° 9° 6° 6° |

EXAMPLE 7

Step 1: A transparent aqua-based nano sol-gel was prepared and obtained by well mixing and then filtering the materials comprising 3.0 wt % solid content of a transparent aqua-based zeolite sol-gel, 3.0 wt % solid content of propyltripropoxysilane as the polysiloxane derivate, 2.0 wt % solid content of polyoxyethylene sorbitan laurate as the non-ionic surfactant, 0.6 wt % solid content of a transparent aqua-based photocatalytic sol-gel of titanium dioxide, and the rest of de-ionized water.

Figure 8:
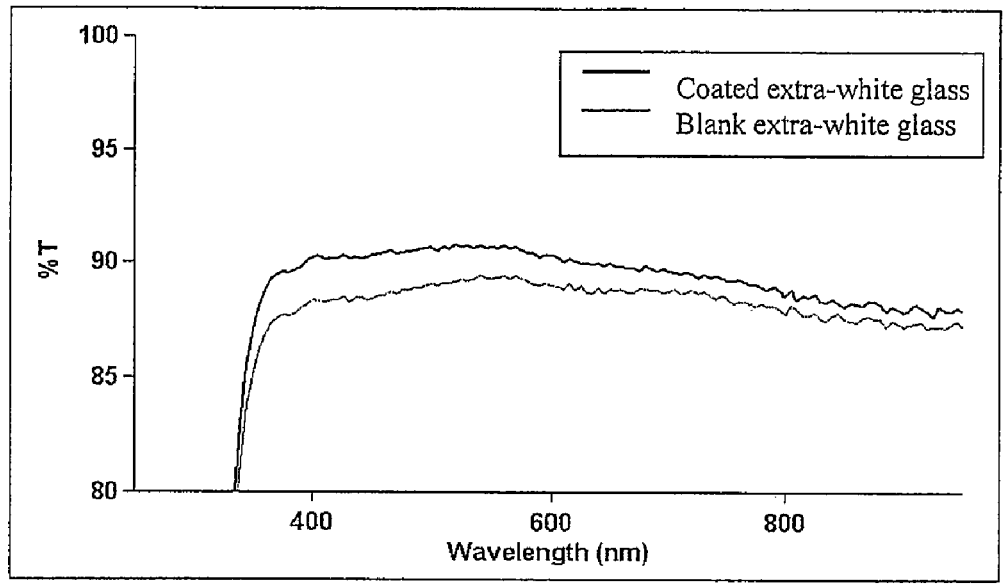
FIG. 8 shows the light transmittance comparison for extra-white glass before coating and after coating according to Example 7.

Step 2: The transparent aqua-based nano sol-gel was evenly applied to the surface of the extra-white glass having the thickness of 5 mm by a sprinkle coating method. As shown in FIG. 1, the surface of glass (1) was firstly cleaned, then the transparent aqua-based nano sol-gel was evenly applied to the surface of the glass (1) by a sprinkle coating method, and a transparent coating film (2) was formed in a thickness of about 65-80 nm on the surface of the glass after cured with nature air drying for 24 hours. A comparison of the transmittance at different wavelengths between the coated extra-white glass and uncoated extra-white glass is shown in FIG. 8. It is obvious that the transmittance of the coated glass is higher than that of the uncoated glass.

Step 3: A comparison of the self-clean property between the coated glass and the uncoated glass was carried out by using the method of "Test Method for Self-Cleaning performance of Photocatalytic Building Materials" published by Taiwan Photocatalyst Industry Association. The surfaces of both the coated glass and uncoated glass were firstly cleaned, and then the contact angle of a droplet on the two pieces of glass was measured, which was about 35°. Oleic acid was evenly spread upon the surfaces of the coated glass and the uncoated glass to simulate the contamination on the glass, and then the contact angle of a droplet was again measured, which was now about 64° indicating that the surfaces of the pieces of glass were contaminated by oleic acid. The two pieces of contaminated glass were exposed to the irradiation of 1 mW/cm$^2$ of UVA light for 24 hours, 48 hours and 72 hours, and the transmittance and contact angle of the two pieces of contaminated glass were measured at each period. The results are shown in Table 13. The lower contact angle indicates a better self-cleaning property. Also, the uncoated glass possesses no self-cleaning property at all.

As a conclusion from the above Step 2 and Step 3, the film formed by applying the transparent aqua-based nano sol-gel of the present invention to the transparent substrates will not decrease the visible light and sunlight transmittance of the transparent substrates, and can perform the self-cleaning property.

TABLE 13

Variation in contact angle of oleic acid contaminated surface under different UVA exposure periods

| | Uncoated glass | Coated glass |
|---|---|---|
| 0 hours | 64° | 64° |
| 24 hours | 64° | 10° |
| 48 hours | 64° | 8° |
| 72 hours | 64° | 7° |

Step 4: The coating films having different thicknesses were formed on the surfaces of glass substrates having the thickness of 5 mm with the same formulation of transparent aqua-based nano sol-gel and coating method as this example. The pieces of coated glass were then cured under different conditions, and the self-cleaning property and transmittance thereof were measured by following the above Step 2 and Step 3. The results are shown in Table 14. It is clear that the film formed by applying the transparent aqua-based nano sol-gel of the present invention to the glass will not decrease the visible light and sunlight transmittance of the glass, and can perform the self-cleaning property.

TABLE 14

Variations in light transmittance and contact angle under different process conditions

| Item | Thickness of coating film | Curing condition | Comparison of light transmittance | Contact angle on coated glass with oleic acid contamination | |
|---|---|---|---|---|---|
| 1 | 120-142 nm | 150° C. 240 min. | The light transmittance of the coated glass is higher than that of uncoated glass. | 0 hours<br>24 hours<br>48 hours<br>72 hours | 64°<br>10°<br>9°<br>7° |
| 2 | 263-285 nm | 300° C. 60 min. | The light transmittance of the coated glass is higher than that of uncoated glass. | 0 hours<br>24 hours<br>48 hours<br>72 hours | 64°<br>9°<br>8°<br>7° |
| 3 | 320-345 nm | 450° C. 10 min. | The light transmittance of the coated glass is higher than that of uncoated glass. | 0 hours<br>24 hours<br>48 hours<br>72 hours | 64°<br>9°<br>7°<br>7° |

EXAMPLE 8

Step 1: A transparent aqua-based nano sol-gel was prepared and obtained by well mixing and then filtering the materials comprising 12.0 wt % solid content of a transparent aqua-based zeolite sol-gel, 0.1 wt % solid content of propyltriethoxysilane as the polysiloxane derivate, 0.1 wt % solid content of polyoxyethylene p-octyl laurate as the non-ionic surfactant, 1.8 wt % solid content of a transparent aqua-based photocatalytic sol-gel of titanium dioxide, and the rest of de-ionized water.

Figure 9:
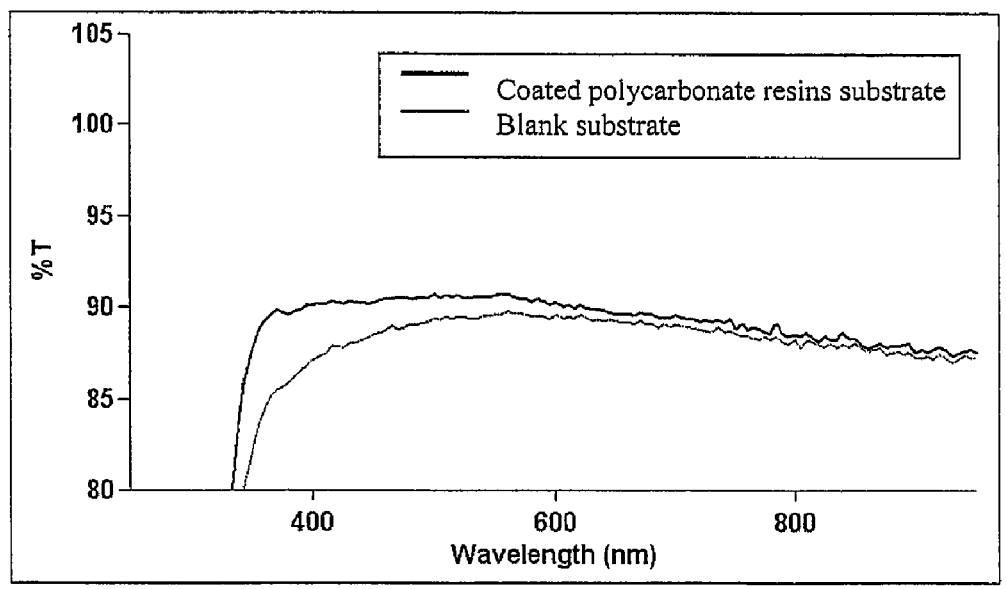
FIG. 9 shows the light transmittance comparison for transparent polycarbonate resins substrate before coating and after coating according to Example 8.

Step 2: The transparent aqua-based nano sol-gel was evenly applied to the surface of a polycarbonate substrate having the thickness of 5 mm by a brush coating method. As shown in FIG. 1, the surface of the polycarbonate substrate was firstly cleaned, then the transparent aqua-based nano sol-gel was evenly applied to the surface of the polycarbonate substrate (1) by a brush coating method, and a transparent coating film (2) was formed in a thickness of about 40-60 nm on the surface of the polycarbonate substrate after cured with nature air drying for 24 hours. A comparison of the transmittance at different wavelengths between the coated polycarbonate substrate and uncoated polycarbonate substrate is shown in FIG. 9. It is obvious that the transmittance of the coated polycarbonate substrate is higher than that of the uncoated polycarbonate substrate.

Step 3: A comparison of the self-clean property between the coated polycarbonate substrate and the uncoated polycarbonate substrate was carried out by using the method of "Test Method for Self-Cleaning performance of Photocatalytic Building Materials" published by Taiwan Photocatalyst Industry Association. The surfaces of both the coated and uncoated polycarbonate substrates were firstly cleaned, and then the contact angle of a droplet on the two polycarbonate substrates was measured, which was about 65°. Oleic acid was evenly spread upon the surfaces of the coated and uncoated polycarbonate substrates to simulate the contamination on the polycarbonate substrate, and then the contact angle of a droplet was again measured, which was now about 75° indicating that the surfaces of the polycarbonate substrates were contaminated by oleic acid. The two contaminated polycarbonate substrates were exposed to the irradiation of 1 mW/cm² of UVA light for 24 hours, 48 hours and 72 hours, and the transmittance and contact angle of the two contaminated polycarbonate substrates were measured at each period. The results are shown in Table 15. The lower contact angle indicates a better self-cleaning property. Also, the uncoated polycarbonate substrate possesses no self-cleaning property at all.

As a conclusion from the above Step 2 and Step 3, the film formed by applying the transparent aqua-based nano sol-gel of the present invention to the transparent substrates will not decrease the visible light and sunlight transmittance of the transparent substrates, and can perform the self-cleaning property.

TABLE 15

Variation in contact angle of oleic acid contaminated surface under different UVA exposure periods

| | Uncoated transparent polycarbonate substrate | Coated transparent polycarbonate substrate |
|---|---|---|
| 0 hours | 75° | 75° |
| 24 hours | 75° | 15° |
| 48 hours | 75° | 11° |
| 72 hours | 75° | 10° |

Step 4: The coating films having different thicknesses were formed on the surfaces of polycarbonate substrates having the thickness of 5 mm with the same formulation of transparent aqua-based nano sol-gel and coating method as this example. The coated polycarbonate substrates were then cured under different conditions at a temperature of lower than 100° C., and the self-cleaning property and transmittance thereof were measured by following the above Step 2 and Step 3. The results are shown in Table 16. It is clear that the film formed by applying the transparent aqua-based nano sol-gel of the present invention to the polycarbonate substrates will not decrease the visible light and sunlight transmittance of the polycarbonate substrates, and can perform the self-cleaning property.

TABLE 16

Variations in light transmittance and contact angle under different process conditions

| Item | Thickness of coating film | Curing condition | Comparison of light transmittance | Contact angle on coated polycarbonate substrates with oleic acid contamination | |
|---|---|---|---|---|---|
| 1 | 375-395 nm | 80° C. 120 min. | The light transmittance of the coated polycarbonate substrate is higher than that of uncoated polycarbonate substrate. | 0 hours<br>24 hours<br>48 hours<br>72 hours | 75°<br>17°<br>12°<br>8° |
| 2 | 130-165 nm | 80° C. 120 min. | The light transmittance of the coated polycarbonate substrate is higher than that of uncoated polycarbonate substrate. | 0 hours<br>24 hours<br>48 hours<br>72 hours | 75°<br>18°<br>14°<br>9° |
| 3 | 240-268 nm | 80° C. 120 min. | The light transmittance of the coated polycarbonate substrate is higher than that of uncoated polycarbonate substrate. | 0 hours<br>24 hours<br>48 hours<br>72 hours | 75°<br>16°<br>11°<br>8° |

The results of Examples 1 to 8 show that the transparent substrate coated with the transparent aqua-based nano sol-gel of the present invention will not decrease the light transmittance and can perform the self-cleaning property.

EXAMPLE 9

Step 1: The transparent aqua-based nano sol-gel having the same formulation as in Example 2 was prepared.

Figure 10:
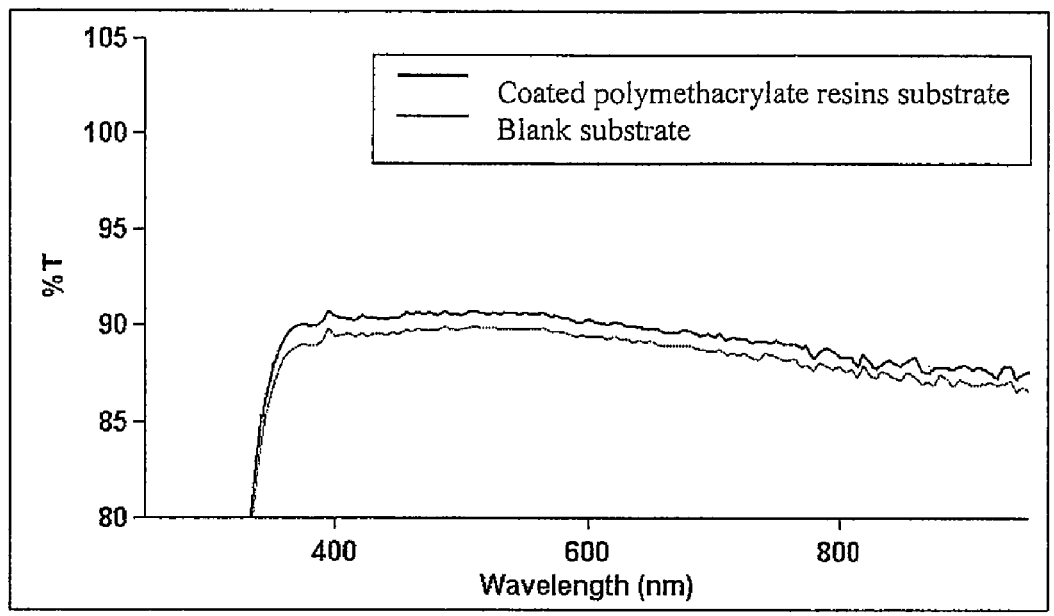
FIG. 10 shows the light transmittance comparison for transparent polymethacrylate resins substrate before coating and after coating according to Example 9.

Step 2: The transparent aqua-based nano sol-gel was evenly applied to the surface of a polymethacrylate substrate having the thickness of 5 mm by the same coating method as in Example 2. As shown in FIG. 1, the surface of polymethacrylate substrate (1) was firstly cleaned, then the transparent aqua-based nano sol-gel was evenly applied to the surface of the polymethacrylate substrate (1), and a transparent coating film (2) was formed in a thickness of about 80-105 nm on the surface of the polymethacrylate substrate after cured with nature air drying for 24 hours. A comparison of the transmittance at different wavelengths between the coated polymethacrylate substrate and uncoated polymethacrylate substrate is shown in FIG. 10. It is obvious that the transmittance of the coated polymethacrylate substrate is higher than that of the uncoated polymethacrylate substrate.

Step 3: A comparison of the self-clean property between the coated polymethacrylate substrate and the uncoated polymethacrylate substrate was carried out by using the method of "Test Method for Self-Cleaning performance of Photocatalytic Building Materials" published by Taiwan Photocatalyst Industry Association. The surfaces of both the coated and uncoated polymethacrylate substrates were firstly cleaned, and then the contact angle of a droplet on the two polymethacrylate substrates was measured, which was about 66°. Oleic acid was evenly spread upon the surfaces of the coated and uncoated polymethacrylate substrates to simulate the contamination on the polymethacrylate substrate, and then the contact angle of a droplet was again measured, which was now about 73° indicating that the surfaces of the polymethacrylate substrates were contaminated by oleic acid. The two contaminated polymethacrylate substrates were exposed to the irradiation of 1 mW/cm$^2$ of UVA light for 24 hours, 48 hours and 72 hours, and the transmittance and contact angle of the two contaminated polymethacrylate substrates were measured at each period. The results are shown in Table 17. The lower contact angle indicates a better self-cleaning property. Also, the uncoated polymethacrylate substrate possesses no self-cleaning property at all.

As a conclusion from the above Step 2 and Step 3, the film formed by applying the transparent aqua-based nano sol-gel of the present invention to the transparent substrates will not decrease the visible light and sunlight transmittance of the transparent substrates, and can perform the self-cleaning property.

TABLE 17

Variation in contact angle of oleic acid contaminated surface under different UVA exposure periods

|  | Uncoated transparent polymethacrylate substrate | Coated transparent polymethacrylate substrate |
| --- | --- | --- |
| 0 hours | 73° | 73° |
| 24 hours | 73° | 18° |
| 48 hours | 73° | 14° |
| 72 hours | 73° | 9° |

Step 4: The coating films having different thicknesses were formed on the surfaces of polymethacrylate substrates having the thickness of 5 mm with the same formulation of transparent aqua-based nano sol-gel and coating method as this example. The coated polymethacrylate substrates were then cured under different conditions at a temperature of lower than 100° C., and the self-cleaning property and transmittance thereof were measured by following the above Step 2 and Step 3. The results are shown in Table 18. It is clear that the film formed by applying the transparent aqua-based nano sol-gel of the present invention to the polymethacrylate substrates will not decrease the visible light and sunlight transmittance of the polymethacrylate substrates, and can perform the self-cleaning property.

TABLE 18

Variations in light transmittance and contact angle under different process conditions

| Item | Thickness of coating film | Curing condition | Comparison of light transmittance | Contact angle on coated polymethacrylate substrates with oleic acid contamination | |
| --- | --- | --- | --- | --- | --- |
| 1 | 315-335 nm | 80° C. 120 min. | The light transmittance of the coated polymethacrylate substrate is higher than that of uncoated polymethacrylate substrate. | 0 hours 24 hours 48 hours 72 hours | 73° 19° 15° 8° |
| 2 | 140-175 nm | 80° C. 120 min. | The light transmittance of the coated polymethacrylate substrate is higher than that of uncoated polymethacrylate substrate. | 0 hours 24 hours 48 hours 72 hours | 73° 18° 14° 11° |
| 3 | 250-278 nm | 80° C. 120 min. | The light transmittance of the coated polymethacrylate substrate is higher than that of uncoated polymethacrylate substrate. | 0 hours 24 hours 48 hours 72 hours | 73° 19° 16° 13° |

EXAMPLE 10

Step 1: The transparent aqua-based nano sol-gel having the same formulation as in Example 4 was prepared.

Figure 11:
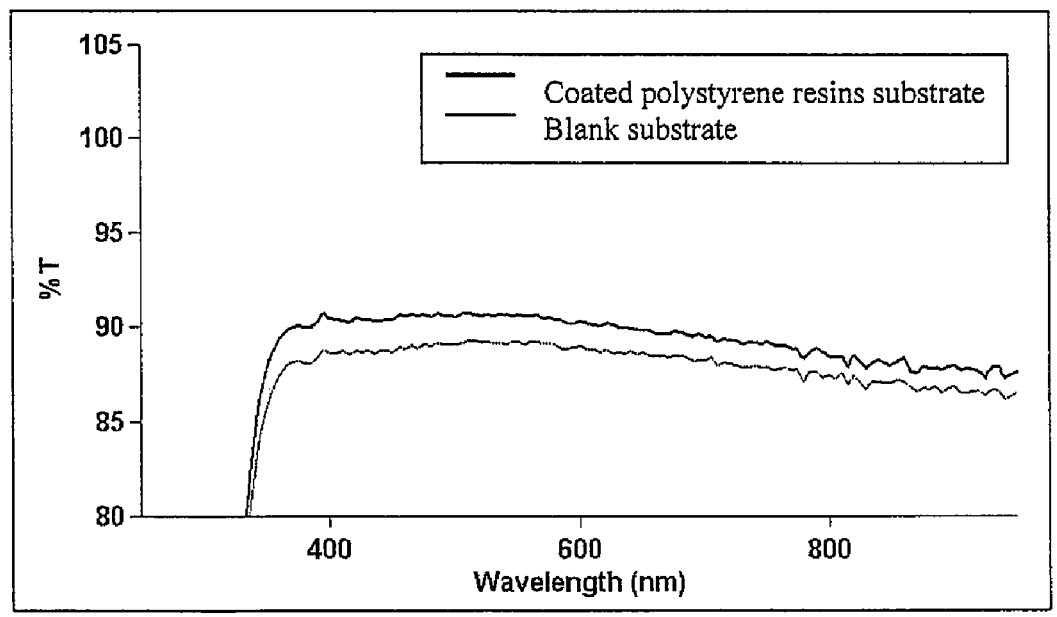
FIG. 11 shows the light transmittance comparison for transparent polystyrene resins substrate before coating and after coating according to Example 10.

Step 2: The transparent aqua-based nano sol-gel was evenly applied to the surface of a polystyrene substrate having the thickness of 5 mm by the same coating method as in Example 4. As shown in FIG. 1, the surface of polystyrene substrate (1) was firstly cleaned, then the transparent aqua-based nano sol-gel was evenly applied to the surface of the polystyrene substrate (1), and a transparent coating film (2) was formed in a thickness of about 43-67 nm on the surface of the polystyrene substrate after cured with nature air drying for 24 hours. A comparison of the transmittance at different wavelengths between the coated polystyrene substrate and uncoated polystyrene substrate is shown in FIG. 11. It is obvious that the transmittance of the coated polystyrene substrate is higher than that of the uncoated polystyrene substrate.

Step 3: A comparison of the self-clean property between the coated polystyrene substrate and the uncoated polystyrene substrate was carried out by using the method of "Test Method for Self-Cleaning performance of Photocatalytic Building Materials" published by Taiwan Photocatalyst Industry Association. The surfaces of both the coated and uncoated polystyrene substrates were firstly cleaned, and then the contact angle of a droplet on the two polystyrene substrates was measured, which was about 68°. Oleic acid was evenly spread upon the surfaces of the coated and uncoated polystyrene substrates to simulate the contamination on the polystyrene substrate, and then the contact angle of a droplet was again measured, which was now about 77° indicating that the surfaces of the polystyrene substrates were contaminated by oleic acid. The two contaminated polystyrene substrates were exposed to the irradiation of 1 mW/cm$^2$ of UVA light for 24 hours, 48 hours and 72 hours, and the transmittance and contact angle of the two contaminated polystyrene substrates were measured at each period. The results are shown in Table 19. The lower contact angle indicates a better self-cleaning property. Also, the uncoated polystyrene substrate possesses no self-cleaning property at all.

As a conclusion from the above Step 2 and Step 3, the film formed by applying the transparent aqua-based nano sol-gel of the present invention to the transparent substrates will not decrease the visible light and sunlight transmittance of the transparent substrates, and can perform the self-cleaning property.

TABLE 19

Variation in contact angle of oleic acid contaminated surface under different UVA exposure periods

|  | Uncoated transparent polystyrene substrate | Coated transparent polystyrene substrate |
| --- | --- | --- |
| 0 hours | 77° | 77° |
| 24 hours | 77° | 22° |
| 48 hours | 77° | 18° |
| 72 hours | 77° | 11° |

Step 4: The coating films having different thicknesses were formed on the surfaces of polystyrene substrates having the thickness of 5 mm with the same formulation of transparent aqua-based nano sol-gel and coating method as this example. The coated polystyrene substrates were then cured under different conditions at a temperature of lower than 100° C., and the self-cleaning property and transmittance thereof were measured by following the above Step 2 and Step 3. The results are shown in Table 20. It is clear that the film formed by applying the transparent aqua-based nano sol-gel of the present invention to the polystyrene substrates will not decrease the visible light and sunlight transmittance of the polystyrene substrates, and can perform the self-cleaning property.

TABLE 20

Variations in light transmittance and contact angle under different process conditions

| Item | Thickness of coating film | Curing condition | Comparison of light transmittance | Contact angle on coated polystyrene substrates with oleic acid contamination | |
| --- | --- | --- | --- | --- | --- |
| 1 | 315-335 nm | 80° C. 120 min. | The light transmittance of the coated polystyrene substrate is higher than that of uncoated polystyrene substrate. | 0 hours 24 hours 48 hours 72 hours | 73° 19° 15° 8° |
| 2 | 140-175 nm | 80° C. 120 min. | The light transmittance of the coated polystyrene substrate is higher than that of uncoated polystyrene substrate. | 0 hours 24 hours 48 hours 72 hours | 73° 18° 14° 11° |
| 3 | 250-278 nm | 80° C. 120 min. | The light transmittance of the coated polystyrene substrate is higher than that of uncoated polystyrene substrate. | 0 hours 24 hours 48 hours 72 hours | 73° 19° 16° 13° |

EXAMPLE 11

Step 1: The transparent aqua-based nano sol-gel having the same formulation as in Example 6 was prepared.

Figure 12:
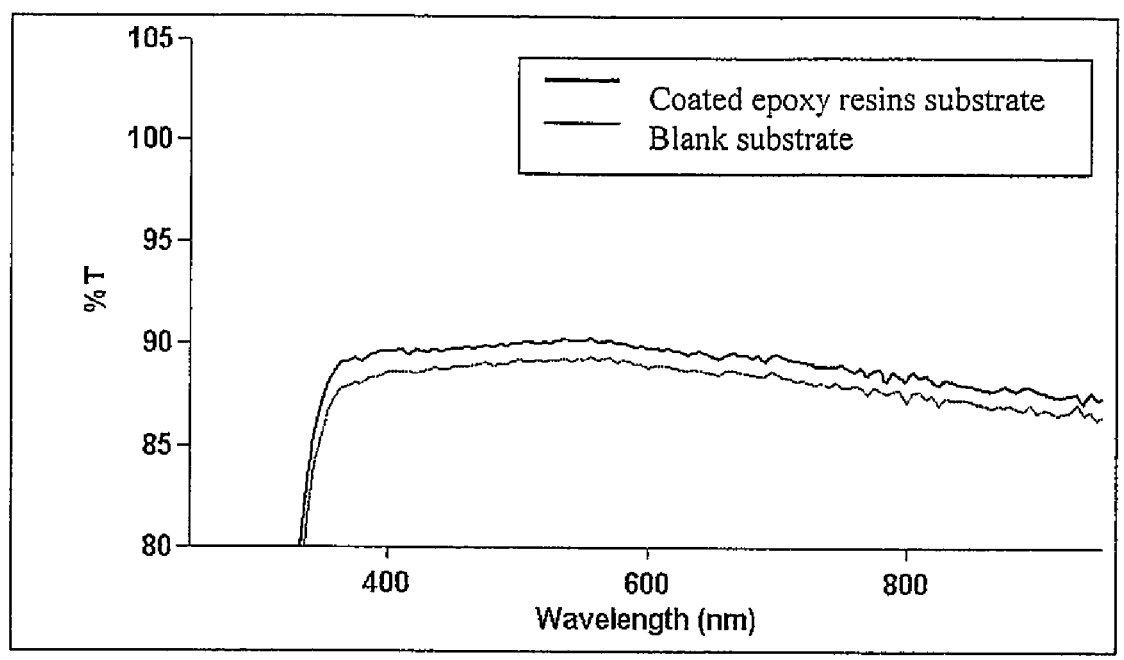
FIG. 12 shows the light transmittance comparison for transparent epoxy resins substrate before coating and after coating according to Example 11.

Step 2: The transparent aqua-based nano sol-gel was evenly applied to the surface of an epoxy substrate having the thickness of 5 mm by the same coating method as in Example 6. As shown in FIG. 1, the surface of epoxy substrate (1) was firstly cleaned, then the transparent aqua-based nano sol-gel was evenly applied to the surface of the epoxy substrate (1), and a transparent coating film (2) was formed in a thickness of about 56-78 nm on the surface of the epoxy substrate after cured with nature air drying for 24 hours. A comparison of the transmittance at different wavelengths between the coated epoxy substrate and uncoated epoxy substrate is shown in FIG. 12. It is obvious that the transmittance of the coated epoxy substrate is higher than that of the uncoated epoxy substrate.

Step 3: A comparison of the self-clean property between the coated epoxy substrate and the uncoated epoxy substrate was carried out by using the method of "Test Method for Self-Cleaning performance of Photocatalytic Building Materials" published by Taiwan Photocatalyst Industry Association. The surfaces of both the coated and uncoated epoxy substrates were firstly cleaned, and then the contact angle of a droplet on the two epoxy substrates was measured, which was about 64°. Oleic acid was evenly spread upon the surfaces of the coated and uncoated epoxy substrates to simulate the contamination on the epoxy substrate, and then the contact angle of a droplet was again measured, which was now about 76° indicating that the surfaces of the epoxy substrates were contaminated by oleic acid. The two contaminated epoxy substrates were exposed to the irradiation of 1 mW/cm$^2$ of UVA light for 24 hours, 48 hours and 72 hours, and the transmittance and contact angle of the two contaminated epoxy substrates were measured at each period. The results are shown in Table 21. The lower contact angle indicates a better self-cleaning property. Also, the uncoated epoxy substrate possesses no self-cleaning property at all.

As a conclusion from the above Step 2 and Step 3, the film formed by applying the transparent aqua-based nano sol-gel of the present invention to the transparent substrates will not decrease the visible light and sunlight transmittance of the transparent substrates, and can perform the self-cleaning property.

TABLE 21

Variation in contact angle of oleic acid contaminated surface under different UVA exposure periods

|  | Uncoated transparent epoxy substrate | Coated transparent epoxy substrate |
|---|---|---|
| 0 hours | 76° | 76° |
| 24 hours | 76° | 17° |
| 48 hours | 76° | 13° |
| 72 hours | 76° | 11° |

Step 4: The coating films having different thicknesses were formed on the surfaces of epoxy substrates having the thickness of 5 mm with the same formulation of transparent aqua-based nano sol-gel and coating method as this example. The coated epoxy substrates were then cured under different conditions at a temperature of lower than 100° C., and the self-cleaning property and transmittance thereof were measured by following the above Step 2 and Step 3. The results are shown in Table 22. It is clear that the film formed by applying the transparent aqua-based nano sol-gel of the present invention to the epoxy substrates will not decrease the visible light and sunlight transmittance of the epoxy substrates, and can perform the self-cleaning property.

TABLE 22

Variations in light transmittance and contact angle under different process conditions

| Item | Thickness of coating film | Curing condition | Comparison of light transmittance | Contact angle on coated epoxy substrates with oleic acid contamination | |
|---|---|---|---|---|---|
| 1 | 315-335 nm | 80° C. 120 min | The light transmittance of the coated epoxy substrate is higher than that of uncoated epoxy substrate. | 0 hours<br>24 hours<br>48 hours<br>72 hours | 76°<br>20°<br>15°<br>12° |
| 2 | 140-175 nm | 80° C. 120 min | The light transmittance of the coated epoxy substrate is higher than that of uncoated epoxy substrate. | 0 hours<br>24 hours<br>48 hours<br>72 hours | 76°<br>18°<br>14°<br>10° |
| 3 | 250-278 nm | 80° C. 120 min | The light transmittance of the coated epoxy substrate is higher than that of uncoated epoxy substrate. | 0 hours<br>24 hours<br>48 hours<br>72 hours | 76°<br>18°<br>13°<br>11° |

Although the present invention has been explained in relation to multiple preferred embodiments in these examples, many other possible modifications and variations can be made without departing from the spirit and scope of the present invention as hereinafter claimed.

While the preferred embodiment of the invention has been illustrated and described in the drawings and foregoing description, the same is to be considered as illustrative and not restrictive in character, it being understood that all changes and modifications that come within the spirit of the invention are desired to be protected.

The invention claimed is:

1. A transparent aqua-based nano sol-gel composition, characterized by comprising: a transparent aqua-based zeolite sol-gel having a particle size of 100 nm or below in a solid content of 0.1~15.0 wt %, a polysiloxane derivate in a solid content of 0.0001~10.0 wt %, a non-ionic surfactant in a solid content of 0.0001~10.0 wt %, a transparent aqua-based photocatalytic sol-gel of titanium dioxide having a particle size of 100 nm or below in a solid content of 0.1~2.0 wt %, and the rest of de-ionized water.

2. The transparent aqua-based nano sol-gel composition as claimed in claim 1, wherein the polysiloxane derivate is selected from the group consisting of methyltrimethoxysilane, methyltriethoxysilane, ethyltributoxysilane, trimethyldiethyoxysilane, dimethoxymethylphenylsilane, triethoxypropylsilane, tripropoxypropylsilane and tributoxymethylsilane.

3. The transparent aqua-based nano sol-gel composition as claimed in claim 1, wherein the surfactant is selected from the group consisting of polyoxyethylene p-octylphenol ether, polyoxyethylene p-octyl laurate, polyoxyethylene sorbitol laurate, polyoxyethylene oleoyl ether, polyoxyethylene stearyl ether, polyoxyethylene sorbitan laurate and oleic diethanol amide.

4. The transparent aqua-based nano sol-gel composition as claimed in claim 2, wherein the surfactant is selected from the group consisting of polyoxyethylene p-octylphenol ether, polyoxyethylene p-octyl laurate, polyoxyethylene sorbitol laurate, polyoxyethylene oleoyl ether, polyoxyethylene stearyl ether, polyoxyethylene sorbitan laurate, and oleic diethanol amide.

5. The transparent aqua-based nano sol-gel composition as claimed in claim 1, wherein the transparent aqua-based zeolite sol-gel is contained in a solid content of 0.1~10.0 wt %.

6. The transparent aqua-based nano sol-gel composition as claimed in claim 5, wherein the transparent aqua-based zeolite sol-gel is contained in a solid content of 0.1~5.0 wt %.

7. The transparent aqua-based nano sol-gel composition as claimed in claim 1, wherein the polysiloxane derivate is contained in a solid content of 0.001~7.0 wt %.

8. The transparent aqua-based nano sol-gel composition as claimed in claim 7, wherein the polysiloxane derivate is contained in a solid content of 0.01~3.0 wt %.

9. The transparent aqua-based nano sol-gel composition as claimed in claim 1, wherein the surfactant is contained in a solid content of 0.001~5.0 wt %.

10. The transparent aqua-based nano sol-gel composition as claimed in claim 9, wherein the surfactant is contained in a solid content of 0.01~3.0 wt %.

11. The transparent aqua-based nano sol-gel composition as claimed in claim 1, wherein the transparent aqua-based photocatalytic sol-gel of titanium dioxide is contained in a solid content of 0.1~1.5 wt %.

12. The transparent aqua-based nano sol-gel composition as claimed in claim 11, wherein the transparent aqua-based photocatalytic sol-gel of titanium dioxide is contained in a solid content of 0.1~1.0 wt %.

* * * * *

UNITED STATES PATENT AND TRADEMARK OFFICE
CERTIFICATE OF CORRECTION

| | | |
|---|---|---|
| PATENT NO. | : 8,158,546 B2 | Page 1 of 1 |
| APPLICATION NO. | : 12/267025 | |
| DATED | : April 17, 2012 | |
| INVENTOR(S) | : Wen-Chuan Liu, Chien-Kuo Huang and Shiaw-Tseh Chiang | |

It is certified that error appears in the above-identified patent and that said Letters Patent is hereby corrected as shown below:

Title Page, please insert the following:

-- (30) Foreign Application Priority Data

Nov. 12, 2007 (TW)...96142648 --.

Signed and Sealed this
Tenth Day of July, 2012

David J. Kappos
*Director of the United States Patent and Trademark Office*